United States Patent
Rodgers

[11] 3,766,481
[45] Oct. 16, 1973

[54] RADIANT ENERGY RECEIVER
[75] Inventor: Paul D. Rodgers, Northridge, Calif.
[73] Assignee: International Telephone and Telegraph Corporation, New York, N.Y.
[22] Filed: Apr. 20, 1970
[21] Appl. No.: 30,149

[52] U.S. Cl.................. 325/363, 325/420, 325/442
[51] Int. Cl............................................... H04b 1/00
[58] Field of Search................. 343/100 ST, 112 D; 325/419, 442, 420, 421, 422, 416, 59, 60, 432, 17, 363, 305

[56] References Cited
UNITED STATES PATENTS
| | | | |
|---|---|---|---|
| 2,955,199 | 10/1960 | Mindes | 325/305 |
| 3,626,301 | 12/1921 | Develet, Jr. | 325/442 |
| 3,263,173 | 7/1966 | Collins et al. | 325/420 |

Primary Examiner—Robert L. Griffin
Assistant Examiner—Barry Leibowitz
Attorney—C. Cornell Remsen, Jr., Walter J. Baum, Paul W. Hemminger, Charles L. Johnson, Jr. and Thomas E. Kristofferson

[57] ABSTRACT

A satellite navigation system including a single-channel receiver for producing output signals from which the geographical position of a ship may be calculated. The receiver utilizes a first intermediate frequency (IF) which is approximately equal to the mean difference of the frequencies of two incoming carriers. This makes it possible to use a single channel because the first IF of one carrier is almost exactly the same as that of the other. A filter may then be used for any further signal separation. Doppler and refraction frequencies may also be easily extracted.

12 Claims, 3 Drawing Figures

RADIANT ENERGY RECEIVER

BACKGROUND OF THE INVENTION

This invention relates to electromagnetic wave transmission and, more particularly, to a radiant energy receiver.

In satellite navigation systems, a fix is obtained upon the position of a ship by feeding to a computer, satellite location data at three different times during a pass. When this data is combined with a Doppler at each satellite location derived from a signal transmitted from the satellite, the fix is complete. This method is now well known in the art.

In shipboard receivers used in such systems, it is necessary to provide two complete channels, one for the Doppler and one for what is known as the refraction frequency. An accurate Doppler measurement is not possible without a refraction frequency measurement because the signal transmitted from the satellite receives not only a Doppler shift, but also one due to the changes in the transmission path, due to the velocity of the satellite. The additional shift is due to the refraction of the electromagnetic beam within and outside of the earth's atmosphere.

From the foregoing, it is apparent that although the refraction frequency shift is not especially needed or wanted, it must be determined so that an accurate measure of the Doppler can be made. A simple demodulation of the satellite signal, thus, produces an output of a frequency which is proportional to the sum of some fractions of the Doppler and refraction frequencies. The refraction frequency, thus, must be separated from the Doppler.

In the said prior art system, the satellite transmitted signals of frequencies of about 400 MHz and 150 MHz. One complete channel was provided for each frequency. Refraction data was then derived from the 150 MHz channel. However, by using the two complete channels, the size, complexity and cost of the equipment has been substantial.

SUMMARY OF THE INVENTION

In accordance with the device of the present invention, the above-described and other disadvantages of the prior art are overcome by beating a signal with both carriers from the satellite or other device with a signal having a frequency about equal to the mean sum of the carrier frequencies. The difference frequencies then turn out to be nearly the same and may be processed in a single channel. Upwards of 40 percent of the prior art equipment is thus no longer needed.

It is also a feature of the invention that the output of the main channel is combined with the beat frequency signal or some fraction or multiple thereof to produce easily the signals of the Doppler and refraction frequencies.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

Figure 1:
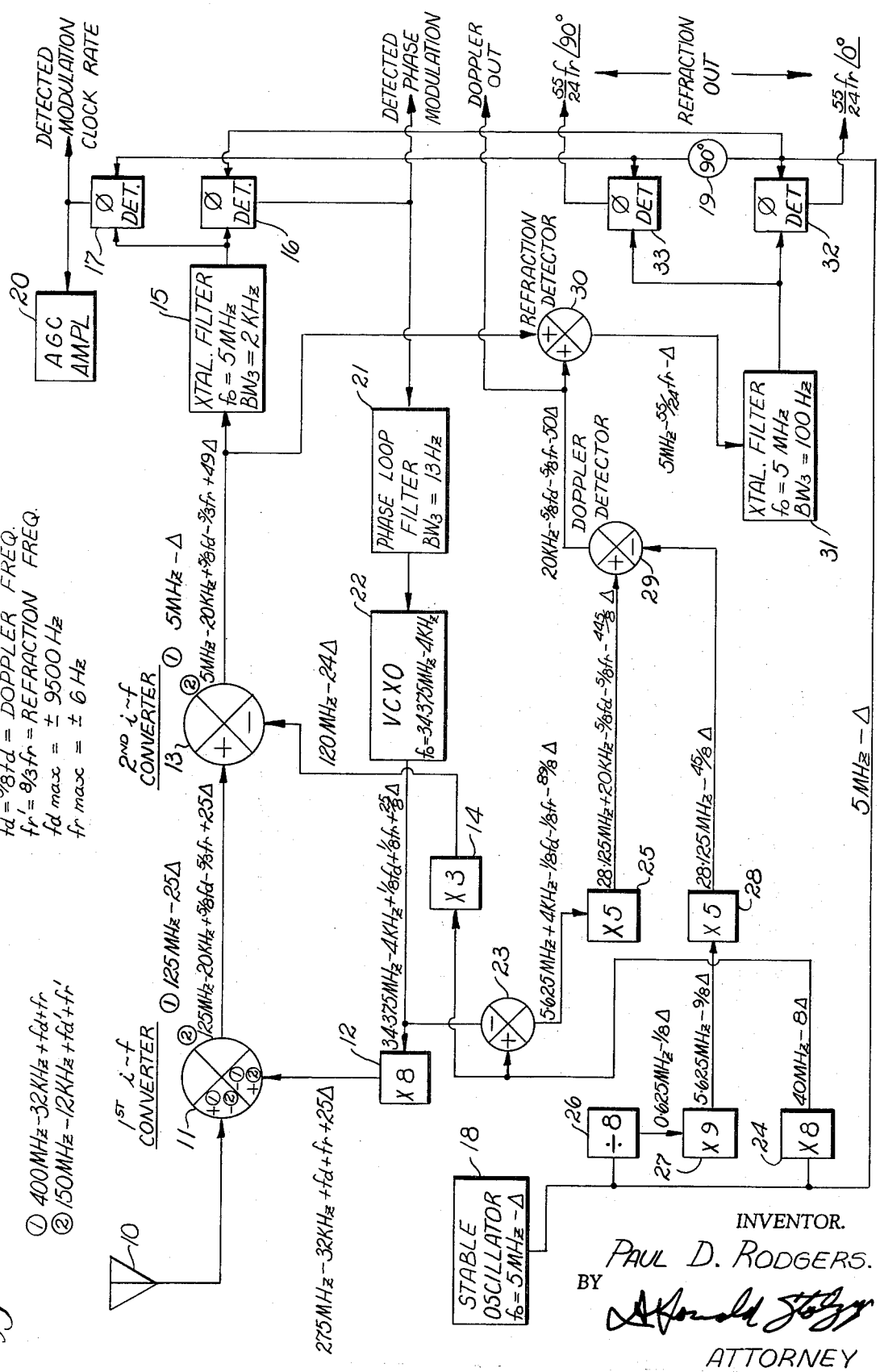
FIG. 1 is a block diagram of one embodiment of the present invention.

In the drawings, in FIG. 1, two carrier waves are received by an antenna 10. These signals are impressed on a first mixer 11. Another signal is also impressed on mixer 11 by a frequency multipler 12. The output of mixer 11 is impressed on a second mixer 13. Mixer 13 also receives an input signal from a frequency multiplier 14. The output of second mixer 13 is impressed upon a crystal filter 15. The output of filter 15 is impressed upon two phase detectors 16 and 17. A stable oscillator 18 supplies a nominal 5 MHz signal directly to phase detector 16 and to phase detector 17 through a phase shifter 19. Phase shifter 19 is a ninety degree phase shifter. The output of phase detector 17 is fed as a detected modulation clock rate to a computer in a conventional way. The output of phase detector 17 is also fed to an automatic gain control (AGC) amplifier 20. The output of phase detector 16 is also fed to the computer as detected phase modulation and to a phase loop filter 21. The output of filter 21 is fed to a voltage-controlled oscillator 22. The output of oscillator 22 is fed to frequency multiplier 12 and to a mixer 23. The output of oscillator 18 is impressed upon a frequency multiplier 24. Mixer 23 receives the output of multiplier 24 and impresses an output on a frequency multiplier 25. The output of multiplier 24 is also impressed upon multiplier 14.

The output of oscillator 18 is first detected by a frequency divider 26, then multiplied by frequency multiplier 27, and then multiplied by a frequency multiplier 28. The outputs of multipliers 25 and 28 are impressed upon a mixer 29. The output of mixers 13 and 29 are then impressed on a mixer 30. The output of mixer 30 is impressed upon a crystal filter 31. The output of filter 31 is impressed upon phase detectors 32 and 33. Phase detectors 32 and 33 receive inputs from oscillator 18 and phase shifter 19 identical to the inputs therefrom to detectors 15 and 16, respectively.

The output of mixer 29 provides a Doppler output to the computer.

If $f_r$ is the refraction frequency, i.e., the frequency shift due to refraction, the output of phase detector 33 is $(55/24)f_r$ at 90°. The output of phase detector 32 is $(55/24)f_r$ at 0°. The fraction arrived at is due to the particular way the signals generated in the embodiment of FIG. 1 are combined. Note will be taken that the Doppler output of mixer 29 contains both the Doppler frequency $f_d$ and the refraction frequency $f_r$. Correction for the refraction frequency must, therefore, be made and is made due to both of the Doppler and refraction outputs from the receiver of FIG. 1. Note will be taken that one carrier wave input to the receiver has a frequency of 400 MHz $-$ 32 kHz $+ f_d + f_r$. The nominal 150 MHz carrier then has a frequency of 150 MHz $-$ 12 kHz $+ f'_d + f'_r$.

The ratio of 150 MHz to 400 MHz is ⅜. Thus, $f'_d =$ ⅜$f_d$. However, refraction frequency in the lower carrier is equal to the ratio of the reciprocal of the carrier frequencies times the refraction frequency of the higher carrier. Thus, $f'_r = (8/3)f_r$. The two carriers, as transmitted from the satellite must be phase coherent. That is, they must be derived from the same source (50 MHz) or from sources which are maintained in phase coherence. The invention will not work unless this is true. However, this is conventional. Thus, the system operates on two simultaneously received signal frequencies of approximately 150 MHz and 400 MHz, such as those transmitted by conventional Navy Navigation Satellites.

Receiver compenents 11, 13, 15, 16, 21, 22, and 12 form a phase-locked loop. However, as will be explained, the loop is driven to produce an output of amplifier 12 of a frequency of 275 MHz $- 32$ kHz $+ f_d + f_r - 25 \Delta$, where $\Delta$ is considered to be an allowable small fraction of 5 MHz below which oscillator 18 may fall. The output from multiplier 12 is then mixed in mixer 11 with the input signal therefrom to antenna 10. Only the difference frequencies at the output of mixer 11 are used. Thus, both difference frequencies are nominally the same. The use of a signal channel is, thus, made possible for creating a common, nominal, second intermediate frequency (IF).

The difference frequency outputs of mixer 11 are indicated on the drawing as are other frequencies. The nominal 125 MHz outputs of mixer 11 are then converted to nominal 5 MHz at the output of mixer 13 by mixing them with the output of multiplier 14. The output of multiplier 14 is 120 MHz $- 24\Delta$. This figure is arrived at by multiplying 8 times 3 times the frequency of oscillator 18. The multiplication provided by multiplier 24 is 8. The multiplication provided by multiplier 14 is 3.

Crystal filter 15 has a center frequency of 5 MHz. The two output signals of mixer 13 are separated by frequency by narrow band filter 15. Filter 15 only passes the signal having the frequency of 5 MHz $- \Delta$. A phase-locked loop holds on this signal only. Filter 21 causes the phase-lock loop, of which it is an element, to have a closed-loop bandwidth of 13 Hz. Oscillator 22 has a center frequency of 34.375 MHz $- 4$ kHz. Due to the electronic servo, the output of oscillator 22 is 34.375 MHz $- 4$ kHz $- \frac{1}{8} f_d - \frac{1}{8} f_r + (25/8) \Delta$. The output of oscillator 22 is then impressed on mixer 11 after the frequency thereof has been multiplied by 8 by multiplier 12.

The use of oscillator 18 with multiplier 25 and mixer 23 is made to convert the nominal carrier output of oscillator 22 to a lower frequency. The use of divider 26 and multiplier 27 is employed to combine the outputs of oscillator 16 to a nominal carrier equal to that of the output of mixer 23. Multipliers 25 and 28 are employed to reduce the outputs of mixer 29 nearly to 20 kHz, and at the same time, to provide a factor of ⅝ for the term ⅝$f_d$ which can be entered from the second output of mixer 13 in mixer 30 to exclude the term $f_d$ from the output of mixer 30. The refraction frequency $f_r$ is thus isolated in the output of mixer 30. The phase detecting methods are conventional in the case of phase detectors 32 and 33 and in the case of phase detectors 16 and 17.

From the foregoing, it will be appreciated that by using the mean sum of the two carrier frequencies for the nominal input from mixer 11 from multiplier 12, a common, nominal IF may be employed. Also, it is a feature of the invention that the expression of the second output signal of mixer 13 contains the terms $(5/8)f_d$ and $(5/3)f_r$ and gives one equation and two unknowns, whereas the output of oscillator 22 gives a second equation and the same two unknowns so that it may be similarly solved by the use of mixer 30. As explained previously, the extracted refraction frequency, $f_r$, is independent of the Doppler frequency, $f_d$. The converse is also true as will be explained in connection with FIG. 3.

The diagram of FIG. 1 shows only the frequency conversion operation in order to simplify understanding of the basic concept. The Doppler output is identical to the Doppler output of preveious designs except that it is factored by ⅝. A multiplication by (8/5) is readily accomplished by the digital computer which processes the data. The refraction output is identical to the refraction output of previous designs. Since the refraction output is not carried on an "offset" frequency, quadrature outputs are required to determine the sense (plus or minus) of the signal. Again, the digital computer multiplies the refraction output by a factor (24/55) before subtracting it from (8/5) of the Doppler output to obtain the desired refraction-corrected Doppler information.

Before discussing further detailed functions internal to the receiver, another overall functional requirement should be established. Since the position of the receiving antenna is determined from a measurement of the Doppler varations on the received signals, any error in frequency measurement will effect the accuracy of the position determination. The receiver's local oscillator is not synchronized with the satellite oscillator; therefore, there is both a difference frequency and a difference frequency rate between the two oscillators. The difference frequency is carried as an unknown in the computation and can therefore be allowed to exist in the Doppler output. The difference frequency rate appears as a part of the Doppler frequency variation and therefore must be held to within acceptable limits (approximately $2 \times 10^{-11}$ per 120 seconds) by the stability of the oscillators which are used. The refraction error, however, is measured as a noncoherent differential between the 150 MHz and 400 MHz transmitted frequencies, and is induced due to propagation anomalies between the satellite and the receiving antenna. Frequency offsets in the receiver local oscillator must not be allowed to appear in the refraction output, since one part in $10^9$ oscillator error would approximate the refraction error frequency being measured. To show the cancellation of local oscillator frequency changes in the refraction output, a frequency increment, $-\Delta$, has been introduced into the 5 MHz stable oscilator of FIG. 1. This is then shown to appear as $-50\Delta$ in the Doppler output but is nonexistent in the refraction output.

The requirement for a second channel in the receiver to process the 150 MHz recieved signal is eliminated by processing it in the 400 MHz channel at a 20 kHz offset. This is accomplished at the first mixer by selecting a conversion frequency that is within 20 kHz of the midpoint between the 150 MHz and the 400 MHz received frequencies.

In the presence of the 400 MHz received signal only, the receiver operates as a conventional phase-lock receiver; and all outputs are as shown in FIG. 1 except the refraction output which is zero. When the 150 MHz received signal is also present, it is converted into the first IF band by the local oscillator signal which is phase-tracking the 400 MHz received signal. The converted 150 MHz signal is amplified in the first IF, converted into the second IF, amplified, blocked from the phase detector by a narrow band filter which passes only the converted 400 MHz signal, and then mixed with the detected Doppler output signal. The "sum" output of the mixing process contains only the refraction information at a 5 MHz offset. Since the refraction signal is nominally zero to 2 Hz and never more than 6 Hz, a narrow band crystal filter can be used for signal-to-noise improvement and to reject other mixer products. The output of the filter is fed to a pair of 5 MHz phase detectors, which can be identical to the main channel phase detectors; and the desired quadrature refraction signals are obtained.

The receiver channel is a "linear" amplifier. Therefore, the two received signals are processed as independent signals, and cross-modulation does not occur. Variations in received levels between the 150 MHz and 400 MHz signals can occur due to propagation anomalies such as multipath and because of antenna pattern differentials. Received level differential variations greater that 10 db will occur a very small percentage of the time that usable data is being received. (Data from both horizon transmissions and overhead transmissions is normally discarded.) The most extreme differential level variation possible (400 MHz threshold and 150 MHz maximum) is 23 db. Due to the ability of the phase-lock loop to operate at negative carrier-to-noise levels at the last IF output and the fact that the coherent carrier output of the last IF is held constant down to threshold, the IF output must not limit for noise levels well above the carrier. For a 13 Hz loop/3 db bandwidth, and a 30 kHz IF/3 db bandwidth, this dynamic range requirement is approximately 30 db. Therefore, no difficulty is encountered due to the lack of automatic gain control on the 150 MHz signal.

No novel or advanced state of the art receiver circuits are required as the desired mixer products are well separated from the undesired products; multipliers and dividers are conventional; and crystal filters are those currently in use. A 3 db degradation in signal-to-noise is introduced at the first mixer due to the conversion of two noncorrelated bands of noise into the first IF passband. The use of IF frequencies which are multiples of the basic reference oscillator frequency require careful shielding and routing of the 5 MHz signal.

The additions to the one-frequency receiver which are necessary to allow detection of the refraction are:
1. Broadband antenna and RF amplifier.
2. 5 MHz broadband mixer.
3. 5 MHz crystal filter.
4. Two 5 MHz phase detectors.

At the first IF converter, the local oscillator signal is phase-following the received 400 MHz − 32 kHz + $f_d$ + $f_r$ signal plus the multiplied 5 MHz oscillator offset, 25 Δ. Subtracting the LO from the received signal, we obtain:

$$\begin{array}{r} 400 \ mHz. - 32 \ kHz. + f_d + f_r \\ -(275 \ mHz. - 32 \ kHz. + f_d + f_r + 25\Delta) \\ \hline 125 \ mHz. - 25\Delta \end{array}$$

The received 150 MHz signal is converted into the IF band as follows:

$$\begin{array}{r} 275 \ mHz. - 32 \ kHz. + f_d + f_r + 25\Delta \\ -(150 \ mHz. - 12 \ kHz. + f_d' + f_r') \\ \hline 125 \ mHz. - 20 \ kHz. + (f_d - f_d') + (f_r - f_r') + 25\Delta \end{array}$$

and since
$f'_d = (3/8)f_d$ and $f'_r = (8/3)f_r$
then the converted 150 MHz signal is
125 MHz − 20 kHz + (5/8)$f_d$ − (5/3)$f_r$ + 25 Δ.
Similarly, at the second IF converter, $$\begin{array}{r} 125 \ mHz. - 25\Delta \\ -(120 \ mHz. - 24\Delta) \\ \hline 5 \ mHz. - \Delta \end{array}$$

and $$\begin{array}{r} 125 \ mHz. - 20 \ kHz. + \tfrac{5}{8}f_d - \tfrac{5}{3}f_r + 25\Delta \\ -(120 \ mHz. \hspace{3em} +24\Delta) \\ \hline 5 \ mHz. - 20 \ kHz. + \tfrac{5}{8}f_d - \tfrac{5}{3}f_r + 49\Delta. \end{array}$$

For the Doppler detector, $$\begin{array}{r} 34.375 \ mHz. \hspace{6em} -\tfrac{55}{8}\Delta \\ -\left(34.375 \ mHz. - 4 \ kHz. + \tfrac{1}{8}f_d + \tfrac{1}{8}f_r + \tfrac{25}{8}\Delta\right) \\ \hline 4 \ kHz. - \tfrac{1}{8}f_d - \tfrac{1}{8}f_r - 10\Delta \end{array}$$

and for the refraction detector, $$\begin{array}{r} 5 \ mHz. - 20 \ kHz. + \tfrac{5}{8}f_d - \tfrac{5}{3}f_r + 49\Delta \\ +\left(\hspace{3em} 20 \ kHz. - \tfrac{5}{8}f_d - \tfrac{5}{8}f_r - 50\Delta\right) \\ \hline 5 \ mHz. \hspace{4em} -\tfrac{55}{24}f_r - \Delta \end{array}$$

The receiver of the invention may be used to receive the 150 MHz satellite-transmitted signal, in which case, the 400 MHz signal would be rejected. Since the satellite message is also transmitted as phase modulation on the 150 MHz carrier, the receiver would still provide all outputs except refraction. The Doppler output would be 7.5 kHz − ⅝$f'_d$ − ⅝$f'_r$, thus, the computer program would have to be changed to accept the new offset frequency. The sensitivity to noise counts in the Doppler when taken from 150 MHz is greater by 8/3 since the amount of Doppler variation is proportional to frequency.

Operation on 150 MHz only would be accomplished by merely switching a different bias voltage to the varactor in the voltage-controlled oscillator such that the tuning range is stepped up in frequency by 2.5 kHz from 34.371 MHz.

Figure 2:
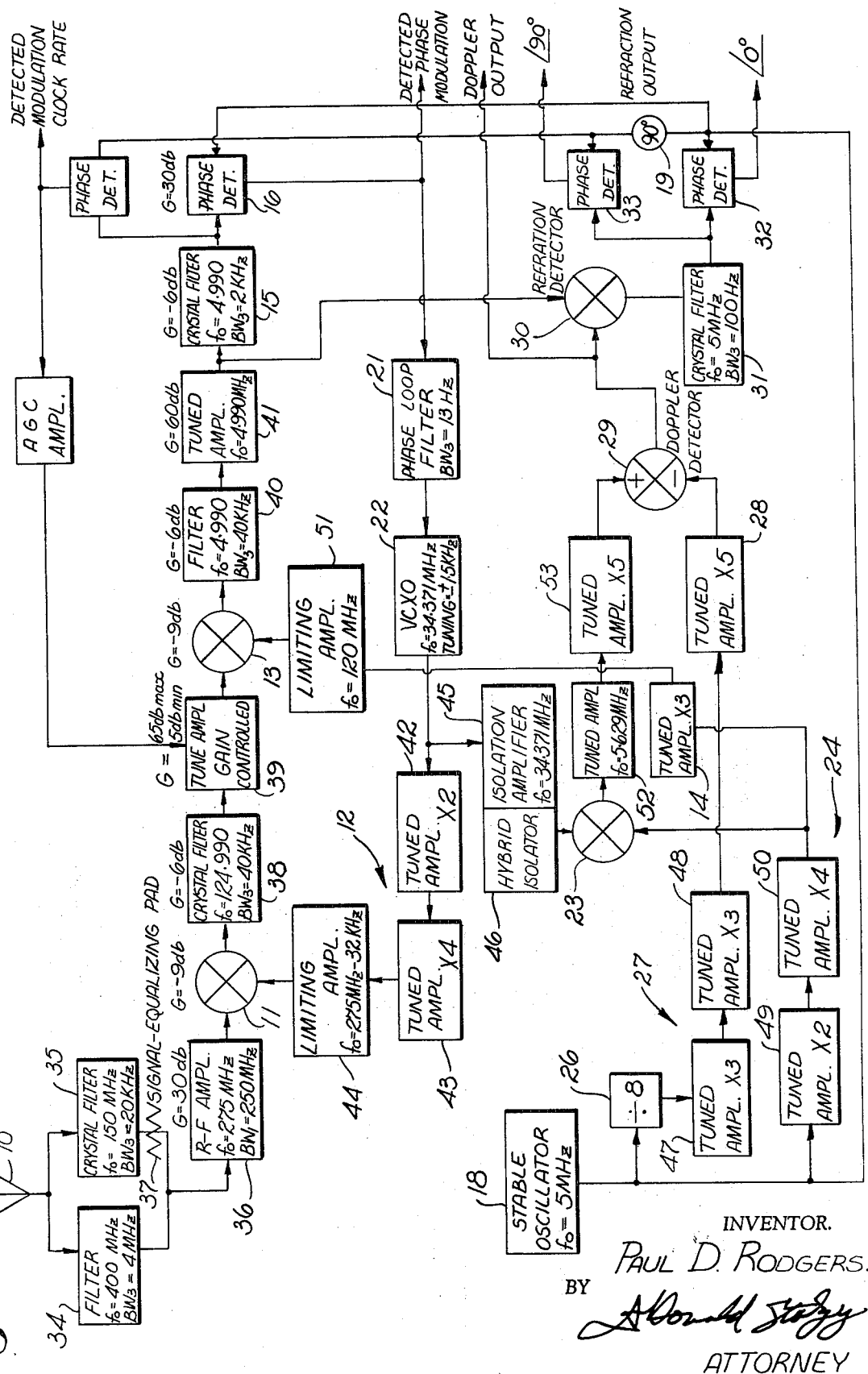
FIG. 2 is a more detailed diagram of the receiver shown in FIG. 1.

In FIG. 2, a more complete block diagram of the receiver of FIG. 1 is shown including filters 34 and 35 connected from antenna 10. Filter 34 is connected to mixer 11 through an RF amplifier 36. Filter 35 is connnected to amplifier 36 through a signal equalizer pad 37. The output of mixer 11 is passed through filter 38 and an amplifier 39 which receives a gain controlled signal from amplifier 20. Filter 15 receives the output of mixer 13 through a filter 40 and an amplifier 41. Multiplier 12 includes a tuned amplifier 42 and a tuned amplififer 43. The output of amplifier 43 is impressed upon mixer 11 through an amplifier 44.

The output of oscillator 22 is impressed upon mixer 23 through an amplifier 45 and a hybrid isolator 46. Multiplier 27 includes amplifiers 47 and 48. Multiplier 24 includes amplifiers 49 and 50. The output of multiplier 14 is impressed upon mixer 13 through an amplifier 51. The output of mixer 23 is impressed upon mixer 29 through an amplifier 52 and an amplifier 53.

Figure 3:
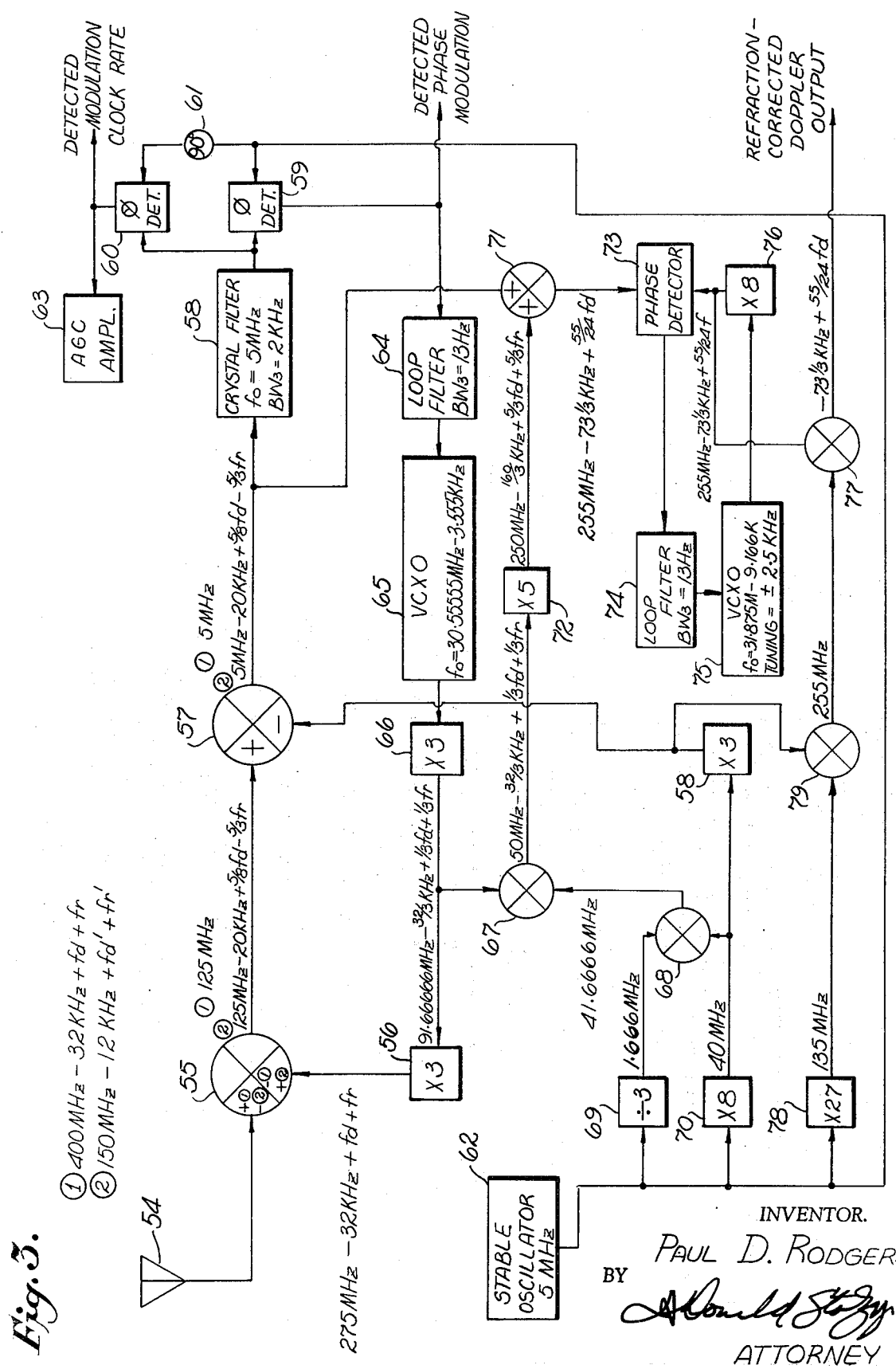
FIG. 3 is a block diagram of an alternative embodiment of the invention.

In FIG. 3, an antenna 54 provides inputs to a first mixer 55. Mixer 55 receives another input from a multiplier 56. The output of mixer 55 is impressed upon a second mixer 57. Mixer 57 also receives an input from a multiplier 58. The output of mixer 57 is impressed upon a crystal filter 58. The output of filter 58 is phase detected by phase detectors 59 and 60 with a phase shifter 61 and a stable oscillator 62 as before. The output of phase detector 60 is impressed upon an AGC amplifier 63. The output of phase detector 59 is impressed upon a loop filter 64. The output of filter 64 is impressed upon voltage controlled oscillator 65. The output of oscillator 65 is impressed upon mixer 55 through a multiplier 66 and multiplier 56. The output of multiplier 66 is impressed upon mixer 67 which receives an input from a mixer 68. Mixer 68 receives inputs from a frequency divider 69 and a frequency multiplier 70, both connected from oscillator 62.

The output of mixer 67 is then fed to a mixer 71 through a frequency multiplier 72. The output of mixer 71 is impressed upon a phase detector 73. Phase detector 73 forms one corner through a loop including filter 74, a voltage controlled oscillator 75, and a frequency multiplier 76. Thus, the output of phase detector 73 goes to filter 74, the output of filter 74 to oscillator 75, the output of oscillator 75 to multiplier 76, and then the output of multiplier 76 to phase detector 73. The output of multiplier 76 is impressed upon a mixer 77 that receives an input from oscillator 62 through a multiplier 78 and a mixer 79. Mixer 79 also obtains an input from multiplier 58.

As before, output of multiplier 56 has a nominal carrier frequency midway between 400 MHz and 150 MHz. This portion of the operation is thus the same as that disclosed in relation to FIG. 1. However, frequency multiplication and division is employed to reduce the output of voltage controlled oscillator 75 or to increase the same so that the input to mixer 71 from multiplier 72 is 250 MHz − (160/3) kHz − (5/3)$f_d$ − (5/3)$f_r$. Thus, in mixer 71, the (5/3)$f_r$ term in the output of multiplier 72 cancels out the −(5/3)$f_r$ in the output of mixer 57. This makes it possible to eliminate the refraction frequency from the output of mixer 71 and from the output of mixer 57 to provide a correct indication of the Doppler frequency by itself. Computer correction is thus unnecessary for refraction.

One difference between FIGS. 1 and 3 is the addition of a tracking loop for filtering the refraction/corrected Doppler in FIG. 3. Due to the ±22 kHz variation of (55/24)$f_d$, the carrier-to-noise ratio cannot be adequately improved by a simple filter. In the concept shown, the tracking loop input frequency is allowed to be high in frequency (255 MHz) in order to reduce the tuning range requirement on the voltage-controlled oscillator. Acquisition may be accomplished by slaving to the main loop voltage-controlled oscillator.

Note that if $f_{m1}$ = 400 MHz and $f_{a1}$ = −32 kHz + $f_d$ + $f_r$, then the first signal received has a frequency of $f_{m1}$ + $f_{a1}$. Similarly, if $f_{m2}$ = 150 MHz and $f_{a2}$ = −12 kHz + $f'_d$ + $f'_r$, then the second signal received has a frequency of $f_{m2}$ + $f_{a2}$.

The approximately 275 MHz input to the first mixer in FIG. 1 is then $$(f_{m1} + f_{m2})/2 + f_{a3}$$

where $f_{a3}$ = −32 kHz + $f_d$ + $f_r$ + 25Δ.

The output from the first mixer is then two signals of frequencies, $(f_{m1} − f_{m2})/2 + f_{a1} − f_{a3}$ and $(f_{m1} − f_{m2})/2 − f_{a2} + f_{a3}$.

By inspection, $f_{m1}$ and $f_{m2}$ are both relatively large in comparision either to $f_{a1}$ or $f_{a2}$ or $f_{a3}$. The term $(f_{m1} + f_{m2})/2$ is also large in comparison to $f_{a1}$, $f_{a2}$, or $f_{a3}$. The 120 MHz input to the second mixer may be expressed as $f_{a4} − f_{a5}$, where $f_{a4}$ = 120 MHz and $f_{a5}$ = 24Δ. The term $f_{a4}$ is thus substantially larger than $f_{a5}$.

If $f_{a6} = (f_{m1} − f_{m2})/2 − f_{a4}$, then $f_{a6}$ = 5 MHz and $f_{a4} = (f_{m1} − f_{m2})/2 − f_{a6}$ where $f_{a6} << (f_{m1} − f_{m2})/2$.

The first and second output signals of the second mixer then have frequencies of $f_{a6} + f_{a1} − f_{a3} + f_{a5}$ and $f_{a6} − f_{a2} + f_{a3} + f_{a5}$, respectively.

The Doppler output of FIG. 1 is $f_{a7} + E(f_d + f_r)$;
where $f_{a7}$ = 20 kHz − 50⅓,
$E$ = ⅝,
$f_d$ is the Doppler frequency, and
$f_r$ is the refraction frequency.

The Doppler output in FIG. 3 is −73⅓ kHz + (55/24)$f_d$. This expression may, thus, be rewritten as $f_1 + D f_d$;
where $f_1$ = −73⅓ kHz, and
$D$ = 55/24.

The expression for the first signal $f_{m1} + f_{a1}$ may also be written $f_{m1} − f_b + f_d + f_r$;
where $f_b$ = 32 kHz, and
$f_{a1} = −f_b + f_d + f_r$.

The expression for the second signal $f_{m2} + f_{a2}$ may be rewritten $f_{m2} − Kf_b + Kf_d + (1/K)f_r$;
where $K = f_{m2}/f_{m1}$, and
$f_{a2} = −Kf_b + Kf_d + (1/K)f_r$.

As stated previously, the input to the second mixer in FIG. 1 may be $(f_{m1} + f_{m2})/2 + f_{a3}$. The term $f_{a3} = −f_b + f_d + f_r + f_i$, where $f_i$ = 25Δ.

Note that in FIGS. 1 and 3, a Doppler output and a refraction output utilize two equations to solve for two unknown. The main channel has a frequency $f_c = f_w − f_e + C(1 − K)[f_d − (1/K)f_r] + f_i$;
where
$f_w$ = 5 MHz,
$f_e$ = 20 kHz,
$f_i$ = 49Δ,
$K$ = ⅜, and
$C$ = 1.

Similarly, the signal mixed therewith is $$f_o = f_n − C(1 − K)(f_d + f_r) − f_j$$

where
$f_n$ = 20 kHz, and
$f_j$ = 50Δ.

The output of the mixer is then $$f_k = f_m − [C(1 − K)(1 + K)/K]f_r − f_n$$

where
$f_m$ = 5 MHz, and
$f_n$ = Δ.

In FIG. 3, the Doppler output is extracted by mixing 5 MHz − 20 kHz + (5/8)$f_d$ − (5/3)$f_r$ with 250 MHz − (160/3) kHz + (5/3)$f_d$ + (5/3)$f_r$. These two frequencies may be respectively rewritten $$f_c = f_w − f_e + C(1 − K)[f_d − (1/K)f_r], \text{ and}$$

$$f_p = f_q − f_s + [C(1 − K)/K](f_d + f_r)$$

where
$f_q$ = 250 MHz, and
$f_s$ = (160/3) kHz.

The Doppler output of FIG. 3 has a frequency $$f_t = -f_v - [C(1-K)(1+K)/K]f_d$$

where $f_v = 73 \frac{1}{3}$ kHz.

Note the manner of operation in FIGS. 1 and 3. The phase-locked loop homes on the 400 MHz signal. Thus, the voltage-controlled oscillator produces an output directly proportional to $f_d + f_r$. This gives us one equation with two unknowns to solve for. The output of the main channel, however, gives an output proportional to $Af_d + Bf_r$, where A and B are constants, one of which is unity and the other of which is not unity. This then gives us two equations and two unknowns to solve for.

The two equations are simultaneously solvable because, by definition, $f_{m1}$ is always different from $f_{m2}$. The output of the main channel is, thus, never directly proportional to $f_d + f_r$ because $$f_d' = Kf_d \text{ and } f_r' = (1/K)f_r, \text{ and}$$

K can never be unity when $f_{m1}$ and $f_{m2}'$ are different because, again by definition, $K = f_{m2}/f_{m1}$.

What is claimed is:

1. A receiving system comprising: an antenna having a bandwidth capable of receiving first and second signals of different frequencies, $f_{m1} + f_{a1}$ and $f_{m2} + f_{a2}$, respectively, where $f_{m1}$ and $f_{m2}$ are both substantially larger than both $f_{a1}$ and $f_{a2}$; first means for producing a first auxiliary signal of a frequency equal to $(f_{m1} + f_{m2})/2 + f_{a3}$; a first mixer for mixing said received signals with said first auxiliary signal to provide one first output signal of a frequency $(f_{m1} - f_{m2})/2 + f_{a1} - f_{a3}$ and another first output signal of a frequency $(f_{m1} - f_{m2})/2 - f_{a2} + f_{a3}$; second means for producing a second auxiliary signal of a frequency $f_{a4} - f_{a5}$ where $f_{a4} >> f_{a5}$ and $f_{a4} = (f_{m1} - f_{m2})/2 - f_{a6}$ where $f_{a6} <> (f_{m1} - f_{m2})/2$; and a second mixer for mixing said second auxiliary signal with said first output signals to provide one second output signal with a frequency of $f_{a6} + f_{a1} - f_{a3} + f_{a5}$ and another second output signal of $f_{a6} - f_{a2} + f_{a3} + f_{a5}$, to provide IF signals to be processed within a common IF channel.

2. The invention as defined in claim 1, including a filter connected from said second mixer to pass said one second output signal and to reject the other, a phase detector connected from said filter, a loop filter connected from said phase detector, a voltage-controlled oscillator connected from said loop filter, said first means including a frequency multiplier connected from the output of said voltage controlled oscillator, a local oscillator, means responsive to the outputs of both of said oscillators for producing a Doppler output signal having a frequency $f_{a7} + E(f_d + f_r)$ where $f_{a7}$ is an intermediate frequency, K is a constant, $f_d$ is the Doppler frequency, and $f_r$ is the refraction frequency, a thrid mixer responsive to said Doppler signal and said other second signal for producing a refraction signal, a phase detector connected from said third mixer, said local oscillator being connected to both of said phase detectors.

3. The invention as defined in cliam 1, incluing a first phase-locked loop connected from said first mixer to said first means, and first loop including a voltage controlled oscillator, thrid means responsive to the output of said oscillator and the output of said first mixer for producing an output signal of a frequency $f_1 + Df_d$, where $f_1$ is substantially constant, D is a constant, and $f_d$ is a variable Doppler frequency.

4. The invention as defined in claim 3, including a phase-locked loop connected from said third means.

5. The invention as defined in claim 1, including a phase-locked loop having a voltage-controlled oscillator, said first means being responsive to the outout of said oscillator for maintaining the phase of said one of said output signal constant, $f_{a1}$ being defined as $$f_{a1} = -f_b + f_d + f_r,$$

$f_{a2}$ being defined as $$f_{a2} = -Kf_b + Kf_d + (1/K)f_r, r,$$

K being defined as $$K = f_{m2}/f_{m1},$$

$f_{a3}$ being defined as $$f_{a3} = -f_b + f_d + f_r + f_l,$$

$f_{m1}, f_{m2}, f_b,$ and $f_l$ being constant frequencies.

6. The invention as defined in claim 5, wherein separation means responsive to said other output signal and to the output of said oscillator are provided for producing an output signal proporational to $f_r$, said separation means including second means responsive to said output signals for producing a signal of a frequency $f_c$ defined by $$f_c = f_d - f_e + C(1-K)(f_d - (1/K)f_r) + f_f$$

where $f_c, f_e, C,$ and $f_f$ are constant, third means responsive to the output of said voltage-controlled oscillator for producing a signal of a frequency, $f_g$, defined by $$f_g = f_h - C(1-K)(f_d + f_r) - f_j$$

where $f_h$ and $f_j$ are constant, and a mixer to mix said signals of frequencies $f_c$ and $f_g$ to produce an output signal of a frequency, $f_k$, defined by $$f_k = f_m - [C(1-K)(1+K)/K]f_r - f_n$$

where $f_m$ and $f_n$ are constants.

7. The invention as defined in claim 5, wherein separation means responsive to said other output signal and to the output of said oscillator are provided for producing an output signal proportional to $f_r$, said separation means including second means responsive to said output signals for producing a signal of a frequency, $f_c$, defined by $$f_c = f_w - f_e + C(1-K)[f_d - (1/K)f_r],$$

where $f_d, f_e, C,$ and $f_f$ are constant, third means responsive to the output of said voltage-controlled oscillator for producing a signal of a frequency, $f_p$, defined by $$f_p = f_q - f_s + [C(1-K)/K](f_d + f_r),$$

where $f_q$ and $f_s$ are constants, and a mixer to mix said signals of frequencies $f_c$ and $f_p$ to produce an output signal of a frequency $f_t$, defined by $$f_t = -f_v + [C(1-K)(1+K)/K]f_d.$$

8. In a system for separating two frequency shifts of first and second carrier signals hving first and second frequencies $f_{m1} - f_b + f_d + f_r$ and $f_{m2} - Kf_b + Kf_d + (1/K)f_r$, respectively, $f_{m1}, f_{m2},$ and K being constant, $f_d$ and $f_r$ being variable, the combination comprising: means responsive to said first carrier signal for producing an output signal proportional to $f_d + f_r$; means responsive to said second carrier signal for producing an output signal proportional to $Af_d + Bf_r$, where A and B are constants, one of said constants A and B being larger than the other, one of said constants A and B being unity; and means including at least one down-converter and filter means operating from said output signals for discriminating between $f_d$ and $f_r$ after said down-conversion, for producing utilization signals of sum and difference frequencies of said output signals such that one of the frequencies $f_d$ and $f_r$ is absent in one of said sum and difference frequencies.

9. A system for receiving, in a single receiver channel, first and second phase coherent radio frequency carriers separated in frequency, said carriers being modulated for transmission of data from a satellite and exhibiting Doppler frequency shift due to satellite motion and a refraction frequency component, comprising:

first conversion means including a first mixer and means connected thereto for generating a local oscillator signal at a controllable frequency, said oscillator signal being generated substantially at a frequency spaced from the midpoint between said first and second carrier frequencies by a predetermined separation frequency to produce first and second IF signals corresponsing to said first and second carriers;

antenna means of sufficiently broad-band characteristic to receive both said first and second carriers and supply them to said first conversion means;

a first IF channel responsive to the output of said first conversion means, said channel having a pass band including said first and second IF signals;

second conversion means responsive to said first IF channel and for down-converting the output of said first IF channel to provide second IF signals from a second IF channel;

a stable oscillator providing a first output at a frequency lower than said first IF channel pass band and at least second and third synchronous signals having frequencies at predetermined multiplies of said first output;

first phase detector means responsive to said second IF signals and said stable oscillator first output to decode said data modulation;

a phase lock loop for frequency tracking said first carrier, said loop including said controlled frequency oscillator associated with said first conversion means and also said first and second IF channels and said first phase detector means;

Doppler signal detecting means responsive to said second and third stable oscillator signals and the output of said controlled frequency oscillator for extracting said Doppler and refraction frequencies;

and refraction signal detecting means responsive to said second IF channel output and said Doppler signal detecting means output for producing an output signal containing said refraction signal.

10. Apparatus according to claim 9 in which said second conversion means is defined as producing a pair of frequency spaced signals at said second IF frequency, corresponding discretely to said first and second carriers in down-converted form, and said refraction signal detecting means includes filter means for excluding from its output substantially all other signals except said down-converted signal from said secod IF channel corresponding to said second carrier, to produce an output signal comprising sunstantially only said refraction signal.

11. Apparatus according to claim 10 including a network of frequency and dividers arranged to operate from said first stable oscillator output to produce said second and third signals, as different multiples of said first oscillator output, and in which said Doppler detecting means includes a first Doppler detector operating fraom said second oscillator output and said controlled frequency oscillator output and a second Doppler detector and operating fraom said third oscillator output and said first Doppler detector output.

12. Apparatus according to claim 11 in which the frequency relationships among said first, second and third stable oscillator signals are predetermined to provide appropriate phase detection references and predetermined frequency spacing of the first and second IF signals corresponding to said first and second carriers.

* * * * *